United States Patent Office 3,016,323
Patented Jan. 9, 1962

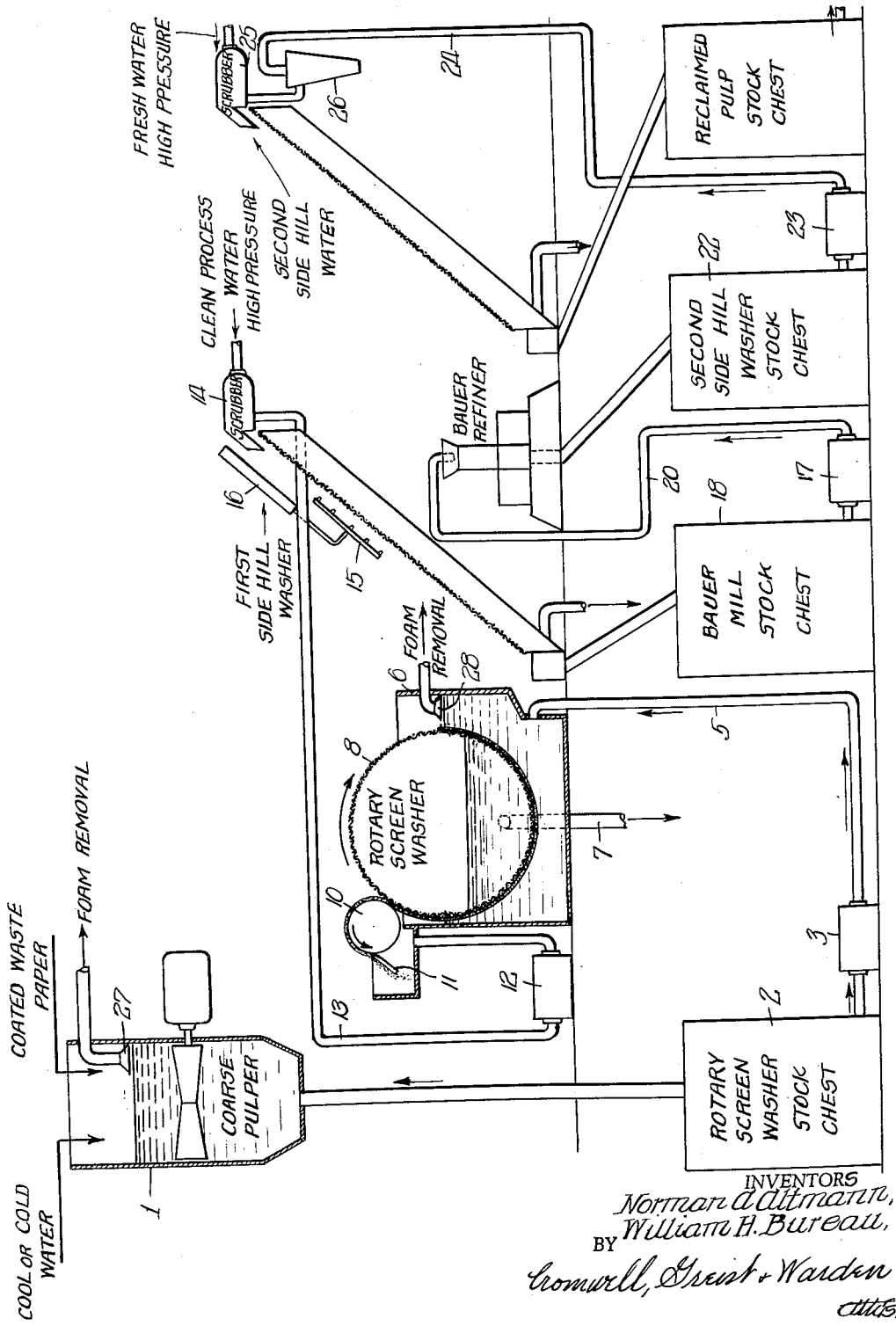

3,016,323
PAPER DE-COATING AND BENEFACTION PROCESS AND PRODUCTS THEREOF
Norman A. Altmann, Wilmette, and William H. Bureau, Glen Ellyn, Ill., assignors to Butler Paper Corporations, Chicago, Ill., a corporation of Illinois
Filed Mar. 13, 1959, Ser. No. 799,357
6 Claims. (Cl. 162—4)

This invention relates to a method of de-coating and processing coated waste paper using cool or cold water throughout without cooking and chemicals, so as to reclaim a large portion of the fiber content as clean pulp suitable for reuse in making paper of better quality than the waste paper stock. The invention relates particularly to such a method of paper de-coating and pulp benefaction for waste paper having a substantial content of ground wood. The waste paper may or may not be printed.

The process of this invention is especially suited for reclaiming heavily coated magazine waste containing a substantial content of ground wood fibers. Heretofore, coated waste paper of this type has been considered undesirable for conventional reclaiming purposes, such as conventional de-inking processes employing cooking and chemicals. It has been considered undesirable due both to the high content of inorganic coating and filler material and also to the content of ground wood fibers. The relatively high content (e.g. 20–35% by weight) of inorganic material means that there will be a high shrinkage or weight loss, while the ground wood content results in substantial additional shrinkage as a result of darkening due to chemical action and the requirement of extensive bleaching during which the ground wood content is "burned out."

Accordingly, coated magazine paper, and other coated waste paper, constitutes a relatively cheap source of paper-making fibers provided it can be de-coated and processed efficiently at low cost. It is an economical source in the process of the present invention since chemicals are not used and therefore there is no shrinkage or weight loss due to chemical action on the ground wood content, while the inorganic content in the form of coating and filler, and fiber fines, shives, ink particles and toners, are efficiently removed so as to leave the fibers in a clean and improved condition for reuse in paper making.

It was discovered according to this invention that coated waste paper containing from 15–40% inorganic material and up to 75% or more of ground wood, either printed or unprinted, could be economically processed so as to reclaim about 45–60% of the fiber content as clean pulp suitable for reuse in making paper better than the coated waste paper processed. Thus, the waste paper is upgraded as well as reclaimed in the process.

While the process of the invention makes use of equipment and apparatus which, for the most part, is conventional or standard from the standpoint of being previously found and used in paper mills, the process involves new combinations of processing steps. Such combinations of essential steps also involve certain critical and preferred arrangements and relationships of steps.

At the outset it should be emphasized that the present invention is directed to a commercially practical and feasible method of reclaiming waste paper. In other words, it is one thing to reclaim paper without regard to cost or feasibility, and it is quite another thing to be able to do it on a commercially successful scale. Further, it should be emphasized that the process of the present invention yields a clean reclaimed pulp which is suitable for making paper and of better quality than the starting or waste paper stock. In other words, the present process is not one wherein waste paper is used to produce paper products of inferior grade. Rather, this invention turns out reclaimed fibers and pulp which are actually upgraded and unique in certain important respects so that the pulp can be used to make paper better in quality than the coated waste processed.

The object of the invention, generally stated, is a method of de-coating and processing printed or unprinted waste paper using only cool or cold water without cooking or chemicals, so as to reclaim a large percent of the fiber content as clean pulp for reuse in paper making.

An important object of the invention is a method of de-coating and processing coated waste paper having a substantial content of ground wood using cool or cold water throughout without cooking and use of chemicals, thereby reclaiming a large percent of the fiber content as clean pulp for reuse in paper making.

A further object of the invention is a paper de-coating and pulp benefaction process which is economical to carry out taking into consideration such controlling factors as cost of waste paper, cost of equipment and plant, operating or power cost, and labor cost.

Another important object of the invention is a method of de-coating and processing coated waste paper having a high ground wood content, using cool or cold water throughout without cooking and chemicals or reagents, thereby reclaiming a large percent of the fiber content as clean pulp suitable as the sole or main source of fibers, in making paper of a quality equal or better in grade than the waste paper stock processed.

Still another important object of the invention is the production of pulp and paper having unique properties and characterized by: the substantial absence of fiber fines or fragments, debris and shives normally found in virgin pulps and papers made therefrom; by a substantially higher content of long fibers than normally found in virgin pulps and paper made therefrom; and, with the fibers being unaltered by chemicals or heat processing.

Certain other objects of the invention will, in part, be obvious and will in part appear hereinafter. For a more complete understanding of the nature and scope of the invention, reference may now be had to the following detailed description thereof taken in connection with the accompanying drawing wherein the single FIGURE is a flow diagram or diagrammatic lay-out of a preferred embodiment of the present waste paper de-coating process.

The de-coating and pulp improving process of the present invention involves five required or essential steps or operations as follows:

(1) *Coarse pulping.*—Breaking up of the waste paper in cool or cold water so as to form a slurry.

(2) *Removal of bulk of inorganic solids on a travelling screen.*—Filtering the coarse pulp so as to accumulate a layer thereof on one side of a travelling screen while removing the water passing through the screen which contains a high percentage of the inorganic material.

(3) *First wash on an inclined screen.*—Discharging a slurry of the pulp, after removal of the bulk of the inorganic solids, onto a travelling screen, onto the upper end of a side hill washer whereby the water portion drains rapidly through the screen carrying with it a substantial amount of the inorganic filler or coating material while the retained fibers form into clumps and bunches which tumble and roll down the screen.

(4) *Intense refining.*—Processing the pulp for not more than a few sceonds between opposed closely set serrated refining surfaces travelling at a relatively high speed in the order of several thousand per minute; such as obtained in a Bauer mill.

(5) *Second wash on an inclined screen.*—Delivering a slurry of the pulp after undergoing operations 1–4 to the top of a side hill washer where the water again drains away through the screen and the pulp again rolls down in clumps and bunches thereby losing water and inorganic material as it does so.

Considering the five foregoing steps, step 1 must be first and step 5 must be last. With respect to steps 2, 3 and 4, step 2 (removal of the bulk of the inorganic solids on a travelling screen) must always precede step 3 (first wash on an inclined screen). Otherwise, steps 2, 3 and 4 may be in any order. Thus, in place of the arrangement or order of steps listed above, step 4 (intense refining) can be the second step or operation, or it can be the third step or operation, or it can be the fourth as listed. Preferably, it is the fourth operation.

When the coated waste paper being processed contains heavily printed matter, it is desirable to remove the foam which naturally forms in the coarse pulper and in the rotary screen washer and which contains toners, ink particles and China clay in concentrated form.

The effectiveness of the inclined screens or side hill washers can be materialy improved by processing the pulp slurry through a so-called submerged jet scrubber immediately before discharging it into the upper end of the side hill washers. Such a submerged jet scrubber and the mode of operation thereof are thoroughly described and disclosed in our co-pending application Serial No. 300,938, filed July 25, 1952, now Patent 2,916,216. The more difficult a waste paper is to de-coat, the more important it is to use one or more jet scrubbers and have one precede at least one of the side hill washers.

Cool or cold water is utilized throughout the process. That is, it is a wet process with the liquid being cool or cold water. The regular water available in a paper mill will ordinarily be satisfactory for the de-coating process. This may come from a stream, lake, well, municipal supply, etc. Depending upon the season, source, geographical location, whether or not the water is processed water being reused, etc., the temperature of the water may range from as low as 32° F. to as high as say 80° F. Normally, the water will range somewhere between 50–70° F. The cooler or colder the water is, the beter it is. The water should not be much higher than 80° F. since then it may begin to have an adverse effect on the fibers and other constituents of the waste paper pulp. Of course, nothing comparable to a cooking step is used in applicant's process and no chemicals, such as conventional alkali or caustic, are used.

Referring now to the accompanying drawing, the essential steps of the de-coating process will be described in detail in the order given above.

STEP 1.—COARSE PULPING

Coated waste paper (e.g. coated magazine inserts) is introduced into a coarse pulper or fiberizer 1 which may be either a batch type pulper or a continuous type pulper. Specifically, the pulper 1 may be a so-called Hydropulper, Slushmaker, Pulpmaster or beater, or any other suitable piece of equipment for converting waste paper into a coarse pulp which can be pumped as a slurry through the system. Usually the waste paper can simply be dumped without any prior size reduction right into the coarse pulper in which it will be worked up into coarse pulp. The water for the coarse pulp must be cool or cold but it need not be fresh or clean water, although the cleaner and cooler the water, the better.

In general, the coated waste paper may be of any known or conventional type. Usually, it will contain a relatively high ground wood content and the inorganic content or burden (i.e. coating and filler material) will run from 15–40% by weight, but generally from 25–30% by weight. The inorganic material will be composed largely of such known coating materials as various clays and pigments secured onto the surface of the paper by suitable binders or adhesives such as starch, protein (soya or casein), synthetic binder or latices (e.g. polyvinyl alcohol, butadiene-styrene co-polymer), etc. All of these binders are subject to being loosened in the present de-coating process.

The coarse pulp is discharged from the coarse pulper 1, either continuously or at the end of a batch, into a coarse pulp chest 2 where it may have a consistency of say from 4–8%. The ash content will be proportional to the content of inorganic material (i.e., coating and filler) and as stated will range from 15–40% by weight. It will be understood that the size of the coarse pulp chest may vary and that there may be one or more of these chests depending upon the size of the particular installation and mill. Likewise, there can be one or more coarse pulpers and they may be run continuously or intermittently, depending upon requirements.

STEP 2.—REMOVAL OF BULK OF INORGANIC SOLIDS ON A TRAVELLING SCREEN

This step is a most important one in the present de-coating for two reasons. First, it constitutes a very efficient and economical operation by which a very large proportion (e.g. 75% or more) of the inorganic burden may be removed. Second, it is essential that the pulp slurry undergo this second step before it can be efficiently and successfully subjected to the essential and important step and operation of washing on an inclined fine screen, i.e. side hill washer. Thus, after the pulp has been subjected to the removal of the bulk of the inorganic burden on the travelling screen, it can then be efficiently handled or processed on the side hill washer wherein the pulp will form into clumps or bunches which roll and tumble down the inclined screen. This rolling and tumbling action was found to be necesary in order to obtain an efficient washing and separation on the fine screen of the side hill washer. However, it was discovered that if the bulk of the inorganic burden is not removed prior to treatment on the side hill washer, then the clumps of fibers do not form well and the pulp will tend to slide down the screen without undergoing much if any tumbling and rolling. The result is that the inclined screen washing action is not very efficient.

Step 2 may be carried out on various forms of travelling screen washers of the rotary screen type depending on a hydrostatic head to force the liquid through the screen while depositing a loose layer of pulp fibers thereon. The coarse pulp is withdrawn from the coarse pulp chest 2 by a pump 3 and then conveyed through the line 5 to the tank 6 of the rotary screen washer. This piece of equipment is essentially an elongated tank in which a screen, closed at its opposite ends, is rotated on a horizontal axis. The screen may have a mesh or U.S. Standard sieve number of 50–80, and would thus be generally characterized as a fine screen. It has to be fine enough so that there is not a serious loss of fibers through the screen. On the other hand, the screen must be coarse enough so that the water laden with filler, coating material, binder and ink particles will pass through readily. Fluid is removed from the inside of the screen 8 through a drain or discharge outlet indicated at 7 at such a rate in relation to the in-flow of pulp slurry into the tank 6 that the level of the liquid on the inside of the screen 8 is substantially lower than the top level of the liquid in the tank 6. For example, this difference in level may be in the order of 12–20 inches, thus providing a fluid head or hydrostatic head which forces the slurry through the screen. As a result of this difference in head, or difference in pressure between the outside and the inside of the screen, a layer of pulp consisting primarily of fiber solids builds up or deposits on the outside of the screen as it rotates, while the water containing the binder (e.g. starch, casein, PVA or synthetic latices) coating and filler material, and ink particles, pass through to the inside of the screen. The layer of pulp is continuously removed by a couch roll 10 from the screen 8 leaving the screen clean for re-entry in the tank 6. If necessary, showers may be directed onto the top of the screen 8 to keep it in a clean condition.

The pulp is stripped off from the couch roll 10 by means of a doctor blade 11 and falls into a trough underneath the couch roll. Sufficient water is added so that the pulp may be pumped as a slurry by the pump 12 through line 13 to the next step or operation.

Whereas the ash content of the pulp entering the rotary screen washer or travelling screen washer may be in the order of 25–30% by weight, the ash content of the pulp removed from the couch roll 10 may be in the order of 6–8%. The rotary screen washer, or a similar type of travelling screen washer is characterized by being continuous and of high capacity. However, it is not practical to obtain the same type of washing or separating action on this travelling screen washer as can be obtained on a side hill or inclined screen washer. Hence, both types of washers have been found necessary in the decoating process.

STEP 3.—FIRST WASH ON INCLINED SCREEN

Preferably, but not necessarily, the pulp slurry from the travelling screen washer is first delivered through the line 13 to the inlet connection of a submerged jet scrubber of the type and action fully disclosed and described in our co-pending application Serial No. 300,938, filed July 25, 1952, and being indicated diagrammatically at 14. Fresh water under high pressure is introduced into the scrubber in the form of submerged high velocity jets with the result that the fibers of the pulp slurry and the particles of inorganic material, binder, and ink when present, are stripped from the fibers and dispersed, and the slurry is put in a dispersed condition where the separation of the fibers from such particles is made easier and more efficient. From the scrubber the slurry is discharged onto the upper end of a side hill washer of known type. It is often desirable to provide the upper end of the washer with a reciprocating shower such as is indicated at 15, which may be operated with a relatively slow reciprocating movement by means of a hydraulic double-acting cylinder unit indicated at 16. Such showers improve the operation of the side hill washer by, affording a washing action, promoting pulp agitation rolling action, and keeping the wire screen clean.

Immediately after the slurry is discharged from the scrubber 14 onto the upper end of the inclined screen of the side hill washer, a large portion of the water with the various fine particles therein drains through the screen while the fibers aggregate into clumps and bunches and commence rolling down the screen, loosing water and increasing in consistency as they go. Because of the distinctive tumbling, rolling and turning action obtained an efficient form of particle separation and fiber cleaning action is effected. The water with suspended fine particles which passes through the screen may be drawn off to a settling pond or other place of disposal, while the pulp is caught in a trough at the bottom of the inclined washer and discharged into a holding chest where it serves as refiner or Bauer mill feed.

At the bottom end of the first side hill washer on which step 3 is carried out, the pulp may have a consistency of say from 7–9% and the ash content will typically have been reduced to say 3–4%.

STEP 4.—INTENSE REFINING

The slurry is withdrawn by a pump 17 from the chest 18 and delivered through line 20 to the inlet connection of a revolving disk refiner such as is described for example in U.S. Patents Nos. 1,744,226 and 2,568,783. The modern forms of these high-speed revolving disk refiners, such as the Bauer, Sutherland, and Sprout-Waldron refiners are highly efficient. In these refiners the pulp passes through in a matter of a few seconds, e.g. 1–5 seconds, and as it does so it is subjected to intense refining and defibering or disintegrating action between by a pair of closely set disks having serrated refining surfaces and rotating at relatively high speeds. For example, if a Bauer refiner is used the disks may be 36" in diameter, and driven in opposite directions to produce relative speeds of 2400 r.p.m., whereby the relative peripheral speeds between the plates will be in the order of several thousand feet per second. The plates are set up relatively close. As the pulp passes through the Bauer or other intense refiner, all shives, fiber bundles and undefibered flakes, are broken down. However, the cutting of the fibers is kept to a minimum and the fibers do not become hydrated or split to any great degree. In other words, this type of refiner seems to be able to give the fibers just the right kind of treatment to bring about reduction to single fibers and yet does not degrade the stock to a material degree. From the Bauer mill or other rotary refiner, the pulp is discharged into a chest such as indicated at 22 and designated Bauer mill stock chest.

STEP 5—SECOND WASH ON INCLINED SCREEN

The Bauer mill stock is removed from the chest 22 by means of a pump 23 and delivered through line 24 to a second side hill washer provided preferably with a scrubber 25 of the submerged jet type as previously mentioned. In order to remove any extraneous matter such as pipe scale, metal particles, bits of rubber, etc., a centrifugal cleaning device 26, such as a Bauer Centricleaner, may be put in the line 24 so that the slurry flows therethrough on the way to the scrubber 25. Here again the slurry is subjected to the intense dispersing and washing or scrubbing action within this piece of equipment and then delivered onto the upper end of the side hill washer where it undergoes a second washing wherein the particles of inorganic coating and filler, as well as binder and any ink particles that may be present, are substantially removed. Again the fibers collect in clumps and bunches and roll and tumble down the length of the screen with the slurry draining therefrom as they go. The drained water is discharged to sewer or settling pond. The pulp reaching the bottom of the second side hill washer will be clean pulp having a consistency of the order of 6–7%, for example, with an ash content of say 2–3% by weight. This pulp which is now clean reclaimed pulp is collected in a de-coated stock chest. It is now in the form of pulp stock that can be used for making paper of an equal grade or better to the grade of the waste paper introduced in the process.

The screens on the two side hill washers will normally be finer than the screen for the rotary washer. They may be 70–100 mesh or U.S. Standard sieve number.

In order to remove foam laden with toner, ink particles, China clay and the like, the coarse pulper may be provided with a suction nozzle 27 and the rotary screen washer may be similarly provided with a suction nozzle 28.

The following specific example will serve further to illustrate the nature of the invention:

Example

Three thousand pounds of Life Magazine inserts (i.e. issues of Life Magazine without the covers) and 10,200 gallons of clean process water (e.g. white water) at a temperature of 60° F., are introduced into the coarse pulper 1. The Life inserts consist of fairly heavy coated paper stock having a ground wood content of about 60% and a chemical pulp content of about 40%. The capacity of the coarse pulper was rated at 3000 lbs. dry fiber. With the coarse pulper in operation a batch was finished or converted into a coarse pulp in approximately 25 minutes. The consistency of the coarse pulp was approximately 5% and the ash content approximately 35% (bone dry basis). The finished batches of coarse pulp were dropped into the coarse pulp chest as each was finished.

Coarse pulp having the above consistency and ash content was pumped from the chest to the rotary screen washer. The rotary screen of this washer was 10' wide, had a diameter of 5', and had a capacity of one ton per hour, dry basis. The head or difference in level between the slurry in the tank on the outside of the screen and on the inside was maintained at about 18" by automatic liquid level control means of known type. The screen 8 was rotated at 10–20 r.p.m. and had a screen sieve number of U.S. 70. The input to the rotary screen washer was maintained at approximately 1 ton per hour, dry basis and the temperature of the slurry was approximately 60° F. having undergone little if any heating in step 1. The ash content of the pulp taken off from the couch roll 10 was approximately 7% with the consistency of the removed pulp being approximately 7.5%. The pulp was removed from the couch roll at approximately 2025 pounds per hour and inorganic burden and binder discharged from the inside of the rotary screen was approximately 900 pounds per hour. Since the ash content of the pulp entering and leaving the rotary screen washer was reduced from 35% to 7%, it will be seen that about 80% or the inorganic burden and binder was removed in this first washing operation.

Sufficient water was added to the pulp removed from the couch roll 10 so as to bring its consistency to approximately 2% at which it could be readily pumped to the next step of the operation.

In step 3 the input of pulp was approximately 2025 pounds per hour, dry basis. Clean process water is approximately 60° F. and under approximately 160 p.s.i. was introduced at a rate sufficient to lower the consistency from 2% to about 0.8%. The pulp at the lower end of the side hill washer had a consistency of approximately 8% and the output at this point was approximately 1815 pounds per hour, dry basis. This pulp had an ash content of approximately 3.5%.

The side hill washer used was 10' wide and 20' long. The showers 15 were supplied with wash water at 160 lbs. p.s.i., using the same supply used for the scrubber 14. These showers reciprocate with an amplitude of approximately 5' and cover approximately the upper half of the side hill screen from one side to the other.

The stock accumulated in the Bauer mill chest from the first side hill washer was delivered into the Bauer mill at a consistency of approximately 4% and at the rate of about 1815 pounds per hour, dry basis. The output was of course equal to the input in this refiner. The temperature of the slurry entering the refiner was approximately 60° F. and on passing through the refiner rose about 10° making the discharge temperature approximately 70° F. The Bauer refiner had 36 inch disks with both plates being driven, each at a speed of approximately 1200 r.p.m., making the relative speed between the plates 2400 r.p.m. A plate setting or clearance of +0.006 inch was found to be satisfactory.

After passing through the Bauer refiner the refined stock was collected in the chest 22 and delivered by the pump 23 through a centrifugal cleaner of the type having a primary stage and a secondary stage. The fiber loss on passing through both stages of this known type cleaning device amounted to approximately 1%. From the cleaner the stock was delivered into the submerged jet scrubber 25 which was supplied with fresh wash water at about 160 p.s.i. The input of pulp was 1815 pounds per hour, dry basis and the entering consistency of the pulp was approximately 1%. On leaving the scrubber the consistency of the slurry was approximately 0.8%, the addition of fresh wash water accounting for this reduction in consistency.

The pulp at the bottom of the second side hill washer had an ash content of 1.5 which compared very favorably with the ash content of virgin pulp which is about 1%.

The output of pulp at the bottom of the second side hill washer was about 1660 pounds per hour, dry basis, making the over-all yield of reclaimed pulp about 55%. This pulp as delivered at the bottom of the second side hill washer had a TAPPI, G.E. (General Electric) Brightness of 65 points. The brightness reading of the coarse pulp discharge from the coarse pulper was 45 points, that of the pulp removed from the couch roll of the rotary screen washer was 47 points, and that of the pulp at the bottom of the first side hill washer was 58 points.

The pulp from the bottom of the second side hill washer was collected in the de-coated stock chest. This pulp can be used as is as 100% of the fiber furnish for making paper and will produce papers have a brightness of approximately 68 points. If desired, the pulp can be bleached with peroxide in known manner with no material loss in strength so that the resulting pulp has a brightness of 75–80 points. When such bleached pulp is used as 100% of the fiber furnish it will produce papers of 80–84 brightness.

If desired, the reclaimed pulp, either bleached or unbleached, can be blended with other fibers to make various types and grades of paper.

The reclaimed pulp is characterized by the substantially complete absence of fiber fines and fragments, debris and shives which are normally found in virgin pulp and paper made therefrom. The pulp of this invention will have a substantially higher content of long fibers than normally found in virgin pulp. These conditions or characteristics may be shown by photomicrographs. Since chemicals are not employed, the lignin and cellulose content will not be altered. Furthermore, the fibers in the pulp reclaimed by this process appear to stress-reliefed or relaxed and paper made therefrom is dimensionally stable with little or no tendency to curl. Because of the substantially complete removal of fiber fines and fragments, and debris, the pulp, and paper made therefrom, will be lint free.

Since certain changes may be made without departing from the spirit and scope of the invention the foregoing example and preferred embodiment of the invention is intended to be interpreted as illustrative and not in a limiting sense.

We claim:

1. The method of de-coating and processing coated waste paper having inorganic coating and filler material using cool or cold water throughout without cooking and chemicals, so as to reclaim a large percent of the fiber content as clean pulp suitable for reuse in paper making, comprising, coarsely pulping coated waste paper in cool or cold water, subjecting the resulting pulp to three intermediate operations including (1) depositing a predominently fibrous layer of pulp solids on one side of a travelling screen from which it is later removed while a substantial portion of the inorganic coating and filler material in said pulp passes with water through said screen as said layer is deposited thereby substantially reducing the ash content thereof, (2) discharging a slurry of said ash-reduced pulp down an inclined screen washer whereby bunches and clumps of primarily fibrous pulp solids roll and tumble down the screen while water containing a substantial portion of the coating material drains through the screen thereby substantially reducing the ash content of said bunches of pulp solids, and (3) processing said pulp for not more than a few seconds between opposed closely set serrated refining surfaces travelling at a high relative speed in the order of at least several thousand feet per minute, operation 1 being performed prior to operation 2 the order of said operations 1, 2 and 3 being otherwise unrestricted, and after said intermediate operations 1, 2 and 3 delivering a slurry of said pulp to the upper end of an inclined screen washer on which a further separation of coating solids from the pulp fibers is obtained as the pulp rolls down the screen.

2. The method of de-coating and processing coated waste paper having an inorganic content in the range of about 15–40% by weight using cool or cold water throughout without cooking or chemicals, so as to reclaim a major portion of the fiber content as clean pulp with an ash content not exceeding about 3.5% by weight and being suitable for reuse in making paper of a quality at least equal to the original coated stock, comprising, coarsely pulping such coated waste paper in cool or cold water, subjecting the resulting pulp to three intermediate operations including (1) depositing by means of difference in pressure a predominantly fibrous layer of pulp solids on one side of a fine mesh travelling screen while a major portion of the inorganic material in the pulp passes with the water through the screen leaving the layer of pulp substantially reduced in content of inorganic material, (2) discharging a slurry of the pulp after operation 1 onto the upper end of a side hill pulp washer whereby its content of inorganic material is further reduced, and (3) processing the pulp at least once through a revolving disk refiner in a few seconds, said refiner having closely set opposed refining surfaces having a relative speed of at least several thousand feet per minute to produce an intense refining and defibering action, said operation 1 preceding operation 2 and with operation 3 being first, second or third, and discharging a slurry of the pulp from operations 1, 2 and 3 onto the upper end of a side hill washer and collecting the pulp at the bottom thereof.

3. The method of de-coating and processing coated waste paper having an inorganic content in the range of about 15–40% by weight using cool or cold water throughout without cooking or chemicals, so as to reclaim a major portion of the fiber content as clean pulp with an ash content not exceeding about 3.5% by weight and being suitable for reuse in making paper of a quality at least equal to the original coated stock, comprising, coarsely pulping such coated waste paper in cool or cold water, subjecting the resulting pulp to three intermediate operations including (1) passing the pulp through a continuous rotary screen pulp washer wherein a major portion of the inorganic burden is removed from the pulp, (2) washing the pulp on a side hill washer whereby its content of inorganic burden is further reduced, and (3) passing the pulp through a revolving disk refiner in a few seconds, said refiner having closely set opposed refining surfaces with the relative speed of the disks being at least several thousand feet per minute to produce an intense refining and defibering action, operation 1 preceding operation 2 and operation 3 being first, second or third, and washing a slurry of the pulp from operations 1, 2 and 3 on a side hill washer.

4. The method of de-coating and processing paper called for in claim 3 wherein said slurry is passed through a submerged jet scrubber immediately prior to discharge onto at least one of said side hill washers.

5. The method of de-coating and processing printed waste paper according to claim 3 wherein foam is removed during said coarse pulping and during washing on said rotary screen pulp washer.

6. The method of de-coating waste paper having an inorganic burden of from about 15–40% by weight using cool or cold water throughout without cooking or chemicals so as to reclaim at least about 45% of the fiber content as clean pulp with an ash content not exceeding about 3% and being suitable for reuse in making paper of a quality at least equal to that of said waste paper, comprising, coarsely pulping such waste paper in cool or cold water, passing the coarse pulp through a continuous rotary screen pulp washer wherein a major portion of the inorganic burden is removed and the ash content reduced to not more than about 8%, next washing the pulp on a side hill washer whereby its ash content is reduced to not more than about 4%, next passing the pulp through a rotary disk refiner, and washing the refined pulp on a second side hill washer whereby its ash content is reduced to not more than about 3%.

References Cited in the file of this patent

UNITED STATES PATENTS

| | | |
|---|---|---|
| 593,011 | Bryant | Nov. 2, 1897 |
| 1,953,150 | Bull | Apr. 3, 1934 |
| 2,077,059 | Snyder | Apr. 13, 1937 |

OTHER REFERENCES

West: Deinking of Paper, published by Inst. of Paper Chem., Appleton, Wis., April 1943, pp. 5–11.